(12) United States Patent  
Warren

(10) Patent No.: US 9,140,287 B2  
(45) Date of Patent: Sep. 22, 2015

(54) FASTENER ASSEMBLY

(71) Applicant: AIRBUS OPERATIONS LIMITED, Bristol (GB)

(72) Inventor: Martin Warren, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 207 days.

(21) Appl. No.: 13/754,471

(22) Filed: Jan. 30, 2013

(65) Prior Publication Data

US 2014/0208576 A1   Jul. 31, 2014

(51) Int. Cl.
*F16B 33/00* (2006.01)
*F16B 5/02* (2006.01)
*B64D 45/02* (2006.01)
*B64D 37/32* (2006.01)

(52) U.S. Cl.
CPC .............. *F16B 33/004* (2013.01); *B64D 45/02* (2013.01); *F16B 5/0241* (2013.01); *B64D 37/32* (2013.01); *Y10T 29/49826* (2015.01); *Y10T 29/49947* (2015.01); *Y10T 29/49948* (2015.01)

(58) Field of Classification Search
CPC ..... F16B 33/004; F16B 5/0241; B64D 45/02; B64D 37/32; Y10T 29/49826; Y10T 29/49947; Y10T 29/49948
USPC .............. 29/525.02, 525.01, 428; 411/366.1; 244/1 A, 159.1
See application file for complete search history.

(56) References Cited

U.S. PATENT DOCUMENTS 4,919,366 A * 4/1990 Cormier ...................... 244/159.1
8,056,862 B1 * 11/2011 Tomerlin et al. ........... 244/159.1

FOREIGN PATENT DOCUMENTS

JP           60-073804 A    4/1985

OTHER PUBLICATIONS

Search Report corresponding to GB 1115003.4 dated Dec. 12, 2011.

* cited by examiner

*Primary Examiner* — John C Hong
(74) *Attorney, Agent, or Firm* — Lowe Hauptman & Ham, LLP

(57) ABSTRACT

A fastener assembly is disclosed for mounting a component to a bracket attached to an inner surface of the skin of an aircraft wing such that the component is thermally and electrically isolated from the bracket is disclosed. The component and bracket each have mounting holes and the fastener assembly includes a fastening element having a shaft to extend through the holes, first and second isolating members mountable on the shaft on either side of the bracket such that the bracket is sandwiched between the first and second isolating members.

12 Claims, 2 Drawing Sheets

FASTENER ASSEMBLY

INTRODUCTION

The present invention relates to a fastener assembly. In particular, it relates to a fastener assembly for attaching a component to a bracket coupled to the inner surface of the skin of an aircraft wing where electrical and thermal insulation is required between the component and the aircraft wing. The invention also relates to an aircraft wing to which a component is mounted using the fastener assembly of the invention and, to a method of thermally and electrically isolating a component mounted to a bracket attached to an inner surface of the skin of an aircraft wing using a fastener assembly according to the invention.

BACKGROUND

It is common for hydraulic pipes and other systems or systems equipment to be routed through the inside of an aircraft wing and to be attached to its inner surface. Similarly, components such as heat exchangers often need to be mounted to the inside surface of the wing. As the wing is effectively a fuel tank, the pipes, systems or other components may be immersed in fuel or, at the very least, exposed to fuel vapour. The fuel can then be used to cool the hydraulic system which can operate at at up to 120 deg. C in normal operation. Therefore, it is important for the fuel tank to be electrically and thermally insulated to stop or reduce the amount of heat being conducted into the wing structure which, if made from carbon composite, can start to degrade at around 70 deg. C.

It is conventional for pipes, systems and components to be mounted on brackets that are mounted on the inside of the skin of an aircraft, in particular on the inner surface of the skin covering the wing using nuts and bolts that pass through holes in the skin and the component or bracket. Ideally, these bolts are a clearance fit through the holes in the skin and the holes in the component or bracket to ensure that the components or pipes can be easily released by undoing the bolts during maintenance or replacement.

When lightning strikes an aircraft wing, the metal outer skin acts as a Faraday cage and so protects the components mounted within the wing from electromagnetic damage and, more importantly, dissipates the energy from the lightning strike away from the fuel. However, it has recently become more common to manufacture the skin of an aircraft wing out of a carbon composite material rather than metal. This reduces its ability to dissipate the energy generated as a result of a lightning strike.

The risk due to lightning is due to either a direct strike or current transfer. All fasteners that may be directly struck by lightning or may form part of a current transfer path which are inside fuel tanks or penetrate the fuel tank boundary require protection against 'out-gassing' (also known as 'pressure sparking'). Current transfer from the bolt shank of a fastener to the surrounding hole of the composite wing through which it passes causes either arcing or material degradation giving rise to a jet of sparks (plasma). Protection is also required against voltage sparking in which a spark jumps a gap between conductive parts and, thermal sparking in which current density causes local heating and out gassing due to defective protective inter-fastener layer (e.g. under the nut of a fastener).

To mitigate against the above issues, mounting brackets are permanently attached to the inner surface of the outer skin of the wing of an aircraft using bolting and installation techniques which protects the skin and bolt hole and guards against the hazards referred to above. One fastener assembly is known from the Applicant's own earlier patent application No. 1101311.7.

However, there is still a risk that lightning will continue to follow a path to the system (such as a hydraulic pipe) mounted to the bracket. Therefore, adequate electrical insulation is also required to prevent the lightning current flow along the system that could result in a spark.

An electrostatic charge can be accumulated by fluid flowing in pipes/across components. Therefore, systems within the fuel tank are bonded in a particular way so that the accumulated charge is conducted out of the fuel tank. In the case of the hydraulic installation, this is through the use of highly resistive fittings at the tank boundaries, as these provide sufficient electrical conductivity to prevent the build up of electrostatic charge, but interrupt lightning current flow. Therefore, where the hydraulic installation is attached or passes through structure it must either be in a manner that is either completely isolated or highly resistive. It is important for the hydraulic installation to follow this philosophy throughout to prevent any sparking.

The present invention therefore seeks to provides a fastener that mounts a component to a bracket attached to an inner surface of a skin of an aircraft wing which is isolated or highly resistive to ensure that current flow due to lightning is suppressed.

Furthermore, some system installation equipment thermally expands as part of its normal operation. However, the wing structure to which it is mounted does not necessarily expand at the same rate. So, in addition to the requirement for the equipment to be thermally and electrically isolated from the structure, provision also needs to be made to allow the attachment to slide or deflect to accommodate thermal expansion effects whilst maintaining thermal and electrical insulation requirements.

SUMMARY OF THE INVENTION

The present invention seeks to provide a fastener assembly that overcomes or at least substantially alleviates the aforementioned problems.

According to the invention, there is provided a fastener assembly for mounting a component to a bracket attached to an inner surface of the skin of an aircraft wing such that the component is thermally and electrically isolated from the bracket, the component and bracket each having mounting holes, wherein the fastener assembly comprises a fastening element having a shaft to extend through said holes, first and second isolating members mountable on the shaft on either side of the bracket such that the bracket is sandwiched between said first and second isolating members and, a retaining element threadingly engageable with the shaft protruding through the second isolating member to clamp said first and second isolating members together against said bracket, wherein one of said isolating members has a central portion that protrudes through said mounting hole in the bracket and the other isolating member comprises a recess to receive said central portion.

In a preferred embodiment, the first isolating member is located between the component and the bracket and has said central portion extending through the hole in the bracket.

The first isolating member may comprise a mounting surface to receive and mount a component thereon.

Preferably, the second isolating member is located between the bracket and the retaining element.

In one embodiment, the first and second isolating members are slideably received on the shaft.

The central portion of the first isolating member may be an interference fit in the recess of the second isolating member.

In another embodiment, the central portion is smaller than the hole in the bracket through which it extends to provide a clearance gap between said central portion and the bracket.

In a preferred embodiment, the assembly includes a bracket member attachable to said bracket coupled to said inner surface of an aircraft wing, said bracket member having a hole therein through which the shaft of the retaining member extends. The bracket member may be coupled to a subsidiary bracket attached to the inner surface of the skin of the aircraft wing.

The first and second isolating members are preferably formed from insulating or electrically resistive material.

According to the invention, there is also provided an aircraft wing including a bracket mounted to an inner surface thereof and a component mounted to said bracket using a fastener assembly according to any preceding claim.

According to the invention, there is also provided a method of thermally and electrically isolating a component mounted to a bracket attached to an inner surface of the skin of an aircraft wing using a fastener assembly according to any preceding claim, the method including the steps of inserting the shaft of a fastening member through a hole in said component, placing a first isolating member on the shaft against said component and inserting the shaft through a hole in said bracket such that the first isolating member is located between the component and the bracket with a central portion of said first isolating member extending through said hole, placing a second isolating member on the shaft so that the bracket is sandwiched between said first and second isolating members and so that said central portion of the first isolating member is received in a recess in said second isolating member and, threadingly engaging a retaining member with the shaft protruding through the second isolating member to clamp said first and second isolating members together against said bracket.

DESCRIPTION OF THE PREFERRED EMBODIMENTS

Figure 1:
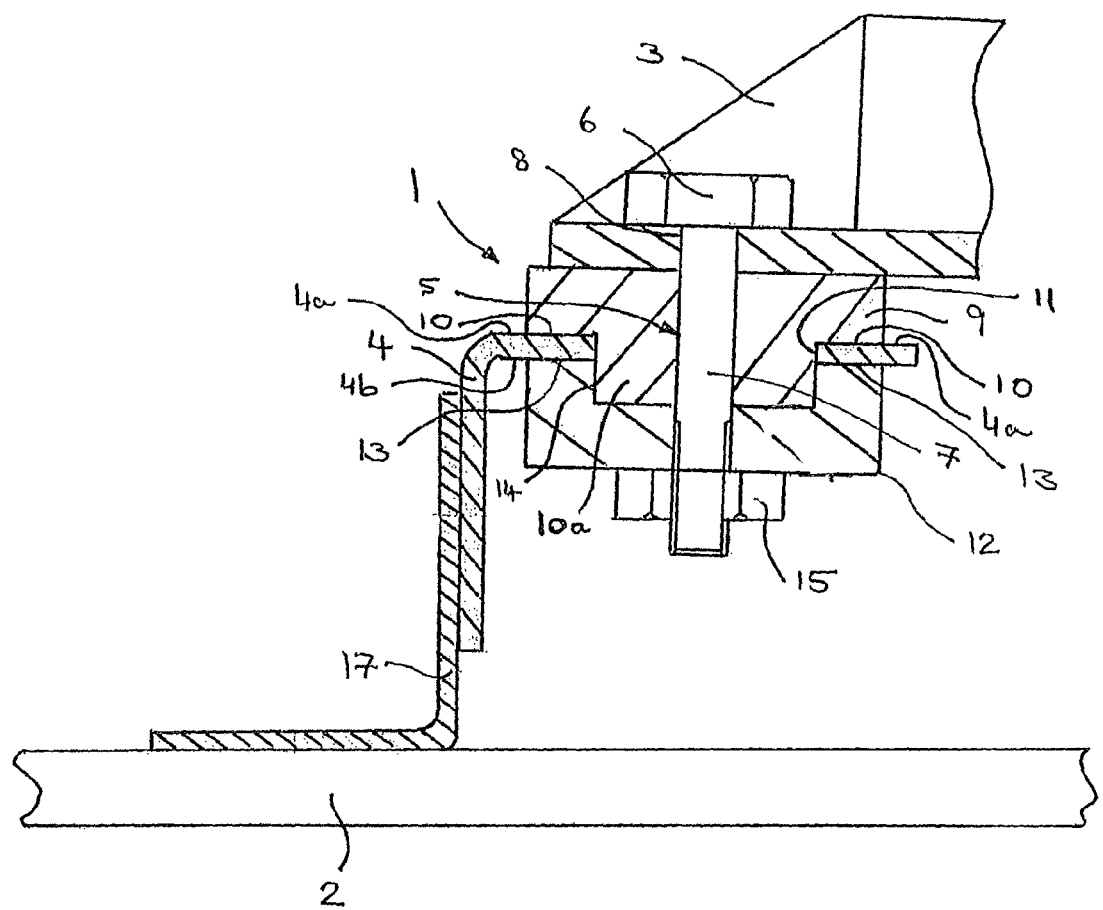
FIG. 1 is a cross-sectional side elevation through a fastener assembly according to the invention shown mounting a component to a bracket attached to the inner surface of the wing structure of an aircraft.
Figure 2:
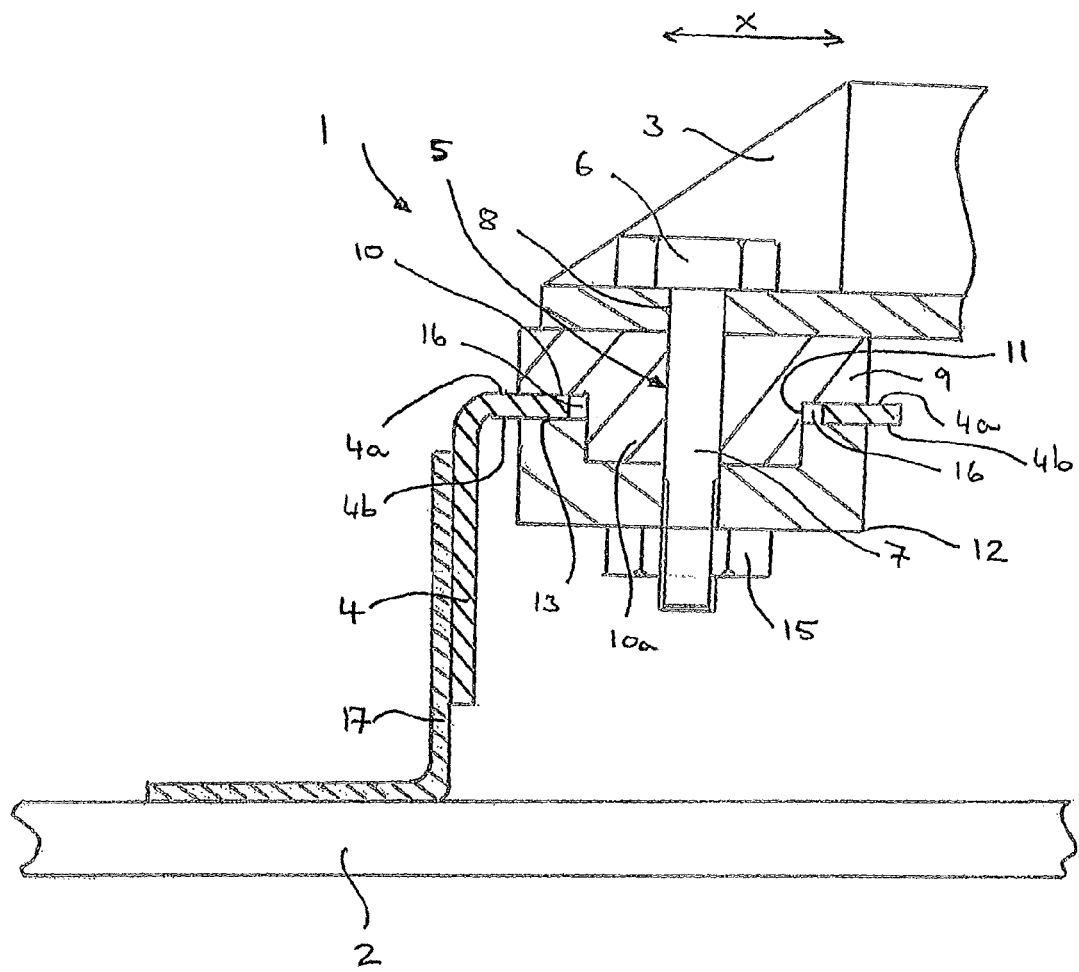
FIG. 2 is a slightly modified version of the embodiment shown in FIG. 1.

A fastener assembly 1 of the invention is shown in an in use condition in FIGS. 1 and 2 and its function is to thermally and electrically isolate a component 3 that is housed within the wing structure 2 of an aircraft from the bracket 4 to which it is mounted.

The fastener assembly 1 comprises a fastening element in the form of a bolt 5 having a head 6 and a shaft 7. The shaft 7 extends through a hole 8 in the component or a mounting element attached to the component 3.

A first isolating member 9 is slideably received on the shaft 7 and has a peripheral region 10 that contacts an upper surface 4a of the bracket 4 and a raised central portion 10a which protrudes through a hole 11 in the bracket 4. The first isolating member 9 separates and spaces the bracket 4 from the component 3.

A second isolating member 12 is slideably received on the shaft 7 and has a peripheral region 13 that contacts a lower surface 4b of the bracket 4 and a recessed central region 14 in which is received the raised central portion 10a of the first isolating member 9.

The central portion 10a of the first isolating member 9 may be an interference fit in the recessed central region 14 of the second isolating member 12, although there may also be a gap between the central portion 10a and the recessed region 14.

A retaining element or nut 15 is threadingly received on the shaft 7 protruding from the second isolating member 12 and is tightened to any desired torque to clamp the bracket 4 between the first and second isolating members 9,12. The clamping force can be varied by adjustment of the internal mating faces of the first and second isolating members 9,12 as well as by adjustment of the bolt torque.

In the embodiment shown in FIG. 1, the central portion 10a of the first isolating member 9 is effectively the same size as the hole 11 in the bracket 4. However, in the second embodiment shown in FIG. 2, the central portion 10a is smaller than the hole 11 so that a gap 16 is formed between the bracket and the first isolating member 9 which allows a degree of thermal expansion and allows the component to slide, together with the first and second isolating members 9,12, relative to the bracket 4 in the direction of the arrow marked 'X' in FIG. 2, thereby ensuring that no load is passed to the wing structure.

It will be appreciated that the first and second isolating members 9,12 are formed from insulating or highly resistive material to minimise thermal or electrical conduction between the component 3 and the bracket 4. The bolt 5 and nut 15 are also thermally and electrically isolated from the bracket 4. The dimensions of the first and second isolating members 9,12 may be selected to ensure that the spacing between the component and the bracket and/or the component/bracket and the nut 15 and bolt 5 are such that thermal and electrical conduction is reduced or eliminated.

The isolating members 9,12 effectively provide a thermal and electrical buffer between a component and the wing structure.

As shown in FIGS. 1 and 2, the bracket 4 may be attached to a subsidiary bracket member 17, which is coupled to the inner surface of the wing 2.

The foregoing description is given by way of example only and modifications may be made to the fastener assembly of the present invention without departing from the scope of the appended claims.

The invention claimed is:

1. A fastener assembly for mounting a component to a bracket attached to an inner surface of a skin of an aircraft wing such that the component is thermally and electrically isolated from the bracket, the component and bracket each having mounting holes, wherein the fastener assembly comprises a fastening element having a shaft to extend through said holes, first and second isolating members mountable on the shaft on either side of the bracket such that the bracket is sandwiched between said first and second isolating members and, a retaining element threadingly engageable with the shaft protruding through the second isolating member to clamp said first and second isolating members together against said bracket, wherein one of said isolating members has a central portion that protrudes through said mounting hole in the bracket and the other isolating member comprises a recess to receive said central portion.

2. A fastener assembly according to claim 1, wherein the first isolating member is located between the component and the bracket and has said central portion to extend through the hole in the bracket.

3. A fastener assembly according to claim 2, wherein the first isolating member comprises a mounting surface to receive and mount a component thereon.

4. A fastener assembly according to claim 2, wherein the second isolating member is located between the bracket and the retaining element.

5. A fastener assembly according to claim 1, wherein the first and second isolating members are slideably received on the shaft.

6. A fastener assembly according to claim 1, wherein the central portion is an interference fit in the recess.

7. A fastener assembly according to claim 1, wherein the central portion is smaller than the hole in the bracket through which it extends to provide a clearance gap between said central portion and the bracket.

8. A fastener assembly according to claim 7, comprising a bracket member attachable to said bracket coupled to said inner surface of an aircraft wing, said bracket member having a hole therein through which the shaft of the retaining member extends.

9. A fastener assembly according to claim 1 wherein the first and second isolating members are formed from insulating or highly resistive material.

10. A fastener assembly according to claim 1, wherein the fastener element is a bolt and the retaining element is a nut.

11. An aircraft wing including a bracket mounted to an inner surface thereof and a component mounted to said bracket using a fastener assembly according to claim 1.

12. A method of thermally and electrically isolating a component mounted to a bracket attached to an inner surface of the skin of an aircraft wing using a fastener assembly according to claim 1, the method including the steps of inserting the shaft of a fastening member through a hole in said component, placing a first isolating member on the shaft against said component and inserting the shaft through a hole in said bracket such that the first isolating member is located between the component and the bracket with a central portion of said first isolating member extending through said hole, placing a second isolating member on the shaft so that the bracket is sandwiched between said first and second isolating members and so that said central portion of the first isolating member is received in a recess in said second isolating member and, threadingly engaging a retaining member with the shaft protruding through the second isolating member to clamp said first and second isolating members together against said bracket.

* * * * *